Aug. 16, 1966  H. C. STRICKER, JR., ET AL  3,266,837
CONVERTIBLE VAN

Filed May 4, 1964  4 Sheets-Sheet 1

INVENTORS
H.C. STRICKER JR.
and G. A. SILL
BY
Robb & Robb
Attorneys

Aug. 16, 1966　　　H. C. STRICKER, JR., ET AL　　　3,266,837
CONVERTIBLE VAN

Filed May 4, 1964　　　　　　　　　　　　　　　　4 Sheets-Sheet 2

INVENTORS
H.C. STRICKER JR
and G.A. SILL
BY Robb & Robb
attorneys

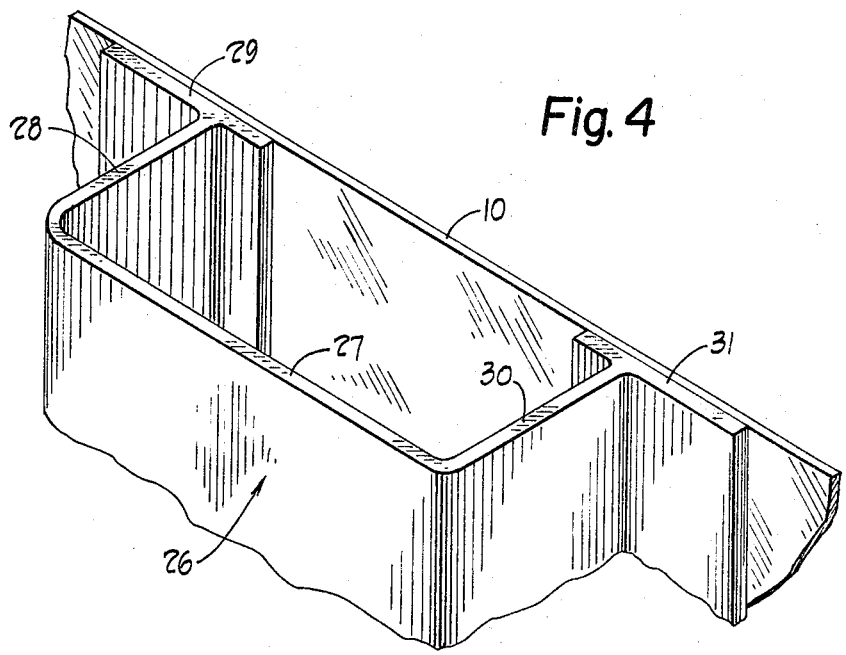
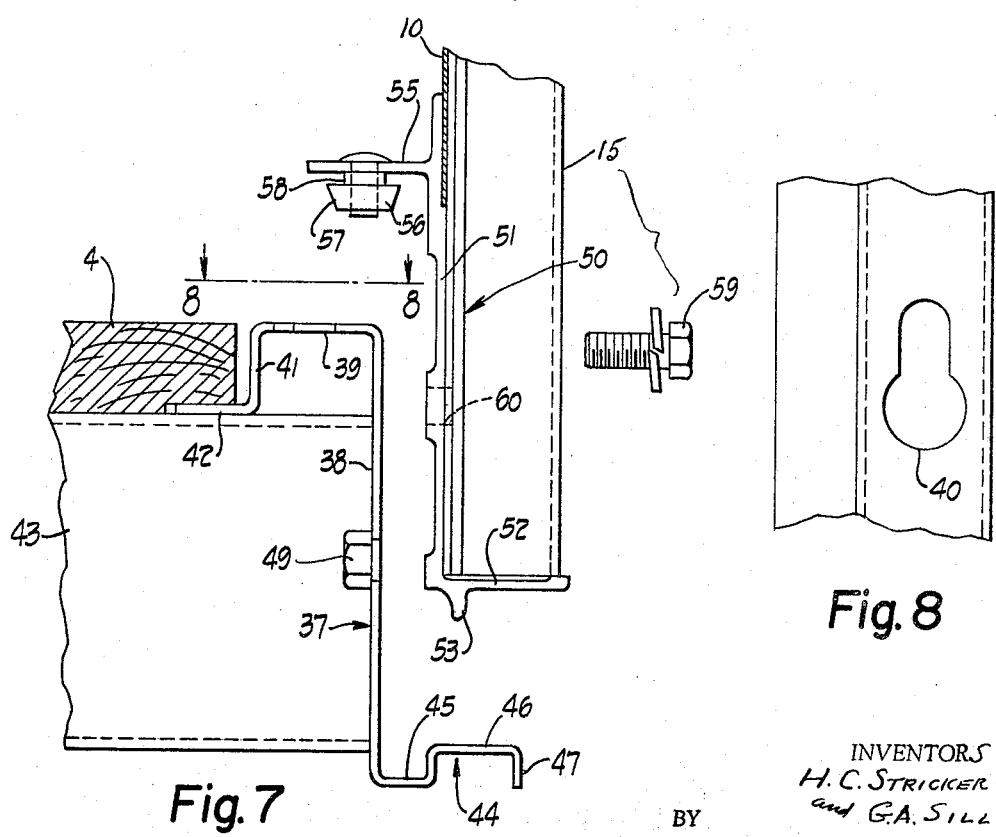

Aug. 16, 1966  H. C. STRICKER, JR., ET AL  3,266,837
CONVERTIBLE VAN

Filed May 4, 1964  4 Sheets-Sheet 4

INVENTORS
H. C. Stricker Jr.
and G. A. Sill
BY
Robb & Robb
attorneys

United States Patent Office 3,266,837
Patented August 16, 1966

1

3,266,837
CONVERTIBLE VAN
Henry C. Stricker, Jr., and Gerald A. Sill, Edgerton, Wis., assignors to Highway Trailer Industries, Inc., Edgerton, Wis., a corporation of Delaware
Filed May 4, 1964, Ser. No. 364,721
8 Claims. (Cl. 296—28)

This invention relates to body construction and primarily to such construction as is useful in connection with freight hauling trailers for over the highway operation.

More specifically, the type of body construction here involved, is what is known as a convertible van, facilitating the conversion of a flat bed trailer into a van type trailer and vice versa.

While the broad concept of converting a flat bed into a van type is not new, many of the instrumentalities availed of in effecting such conversion are new as disclosed herein, and particularly those relating to the sealing of the body elements against leakage from rain or other elements, and likewise the maintaining of the respective parts in their proper location to carry out their function in the assembly as a whole.

It is therefore a principal object of this invention to provide a convertible van of the class described, in which the various parts which go to make the van up are of novel design so that the positioning of certain of the elements, will effectively provide a sealing and likewise the members are maintained in position by novel interconnecting parts which at the same time provide for removability as desired.

A more specific object of the invention is to provide a convertible van of the class under consideration, in which the various panels or racks which are used to comprise the sides thereof, are of identical configuration, and adapted to be positioned with respect to the bed which is used as a basis for the van so as to be removable therefrom but at the same time securely fastened thereto when in position for the purpose as to prevent either leakage or undesired shaking and rattling thereof.

Other and further objects of the invention will be understood from a consideration of the specification appended hereto and disclosed in the drawings wherein:

FIGURE 4 is a perspective view similar to FIGURE 3 showing the upper end of one of the stakes used in construction of the rack.

FIGURE 7 is an enlarged fragmentary exploded view illustrating the method of assembling of the various parts for converting the flat bed into a closed van.

FIGURE 8 is a view taken about on the line 8—8 of FIGURE 7 looking in the direction of the arrows.

Figure 1:
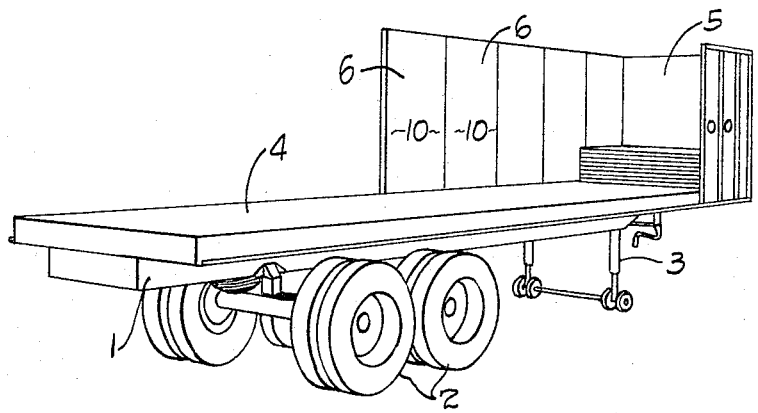
FIGURE 1 is a somewhat diagrammatic perspective view illustrating generally a van of the class hereinunder consideration.

Referring to FIGURE 1 therefore, the said trailer gen-

2 erally disclosed is provided with the body generally indicated at 1 having the usual running gear in this instance a tandem rear end designated 2 with the usual landing gear 3 forward, and a bed 4 of the flat bed type with certain of the racks supported thereon, the rack being the term used for one of the panels which is used to form the sides of this type of van.

The forward end of the trailer unit is denoted at 5 and is usually fixed, in this instance at any rate, to provide in conjunction with certain of the side members a storage place for racks disassembled when they are removed for one purpose or another.

Figure 3:
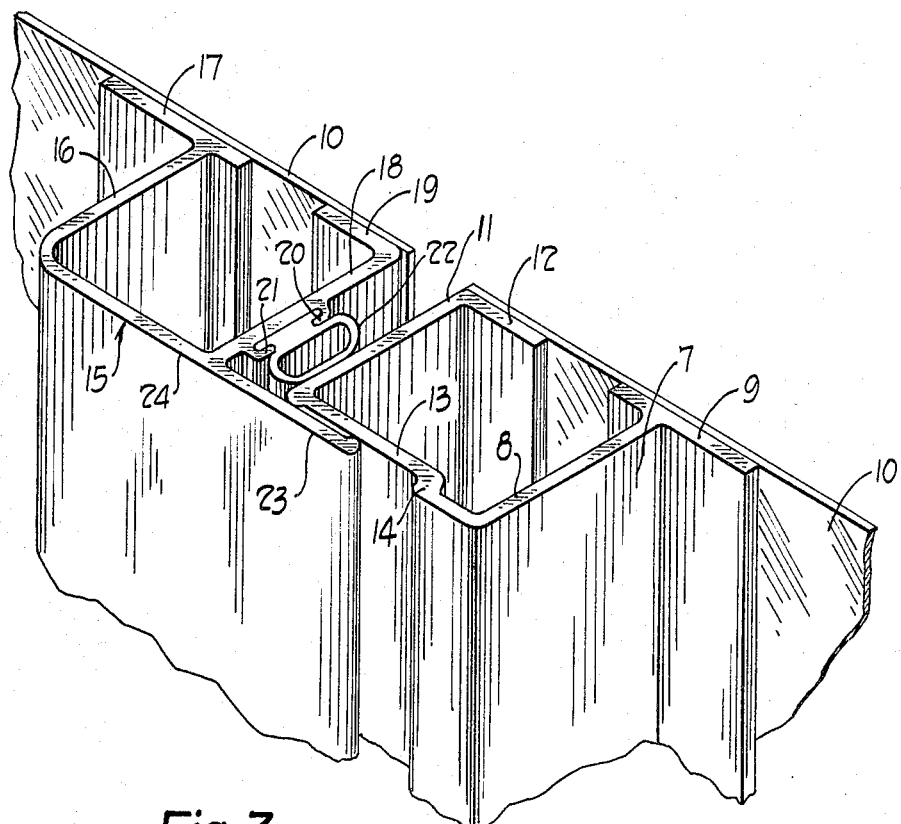
FIGURE 3 is a perspective view, fragmentary in nature showing the sealing means in place and certain constructional features of the racks comprising the side elements.
Figures 5, 6:
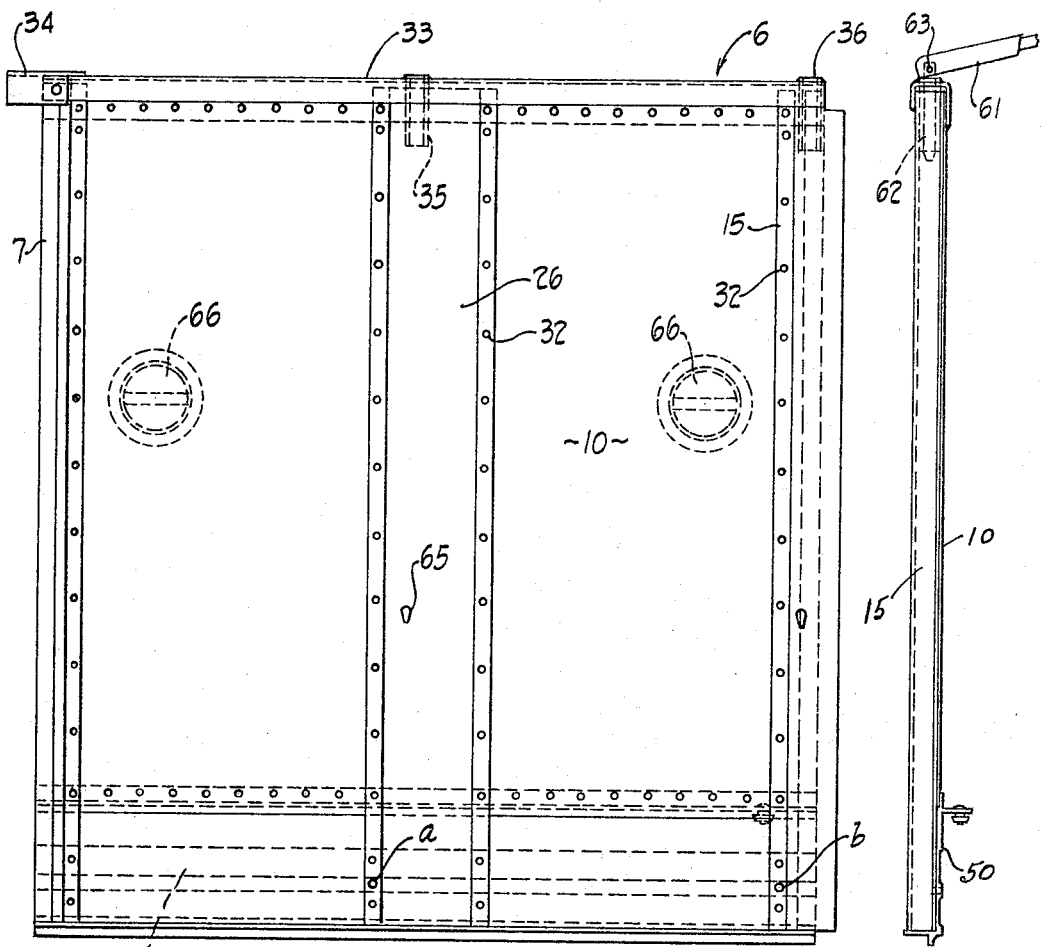
FIGURE 5 is a side view showing one of the racks as removed from the van or body, and illustrating the relationship of various parts.
FIGURE 6 is an end view of the racks disclosed in FIGURE 5.
Figure 9:
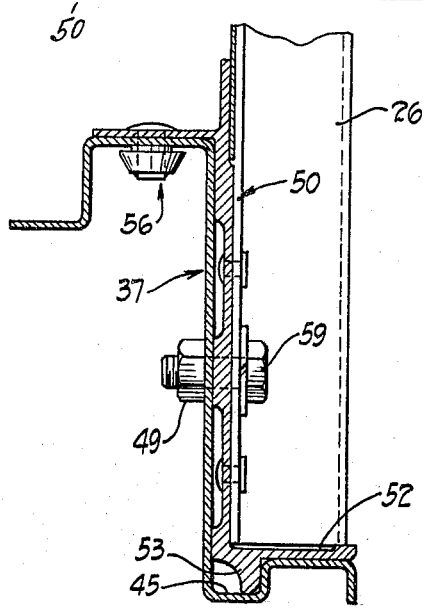
FIGURE 9 is an end view fragmentary in nature showing the rack in assembled position on the flat bed and connected thereto.

Referring now to FIGURE 5, the rack shown therein is generally denoted at 6, and includes a forward stake 7 more particularly disclosed in FIGURE 3 in cross section, as being generally rectangular with one of the sides 8 thereof provided along one edge with a flange 9 whereby the stake is fastened to a side sheet such as 10.

Additionally, another leg of the stake 7, denoted 11 is provided with an inturned flange 12 likewise adapted to be fastened to the side sheet 10.

The portion 13 of the stake 7, is equipped with an offset at 14 for purposes which will be apparent as this description proceeds.

The aft stake 15, likewise particularly disclosed in FIGURE 3, is fastened at the rear extremity of the side sheet and is generally of a similar form to the stake 7, in this instance the side 16 being equipped with a flange 17 which is fastened to an identical sheet 10, being the sheet adjacent the sheet 10 initially described, the other side 18 having the inturned leg or lip 19 fastened to the sheet 10 likewise.

The side 18 is further provided with inwardly extending parts 20 and 21 which between them are adapted to receive the mating portion of a resilient gasket generally denoted 22, in this case being hollow as indicated, said gasket 22 providing a seal and adapted to coact with the side 11 of the stake 7 as will be understood from a consideration of FIGURE 3.

The aft stake 15, is further equipped with a flange 23 being a continuation of the side 24 and adapted to extend over the face of the offset section 13 of the stake 7 previously described.

It will thus be seen that inasmuch as the sheet 10 at the left in FIGURE 3 is a sheet forward of the sheet 10 at the right in FIGURE 3, the effect of this arrangement is to exclude water and other foreign material from entering between the racks 6 as will be understood. It is further noted that the racks 6 are in each case identical and provided with an intermediate stake 26 which is of the shape indicated in FIGURE 4, namely hat shape, including the outer wall 27, the side wall 28 at the inner end of which is the flange 29 fastened to the sheet 10, the other leg or wall 30 opposite the wall 28 being similarly equipped with a flange 31 fastened to the sheet 10 likewise.

The fastening may be effected by rivets such as are indicated in FIGURE 5 and denoted 32 in all cases.

Along the upper side of the rack 6, is an interlock and bow rail 33 which at one end is provided with an interlock channel 34 adapted to extend over and to receive within the same the upper end of an aft stake such as 15, the channel 34 being generally U-shaped and positioned in an inverted position.

A bow end socket 35 is positioned in the interlock and bow rail 33, in the form of a hollow or tubular member, a similar socket being provided at 36 for purposes which will be explained subsequently.

Referring now more particularly to FIGURE 7 initially, the bed 4 of the body 1, is shown as having located along its edge as seen in FIGURE 1 and likewise in FIG- URE 7 of course, a side rail 37 which is basically Z-shaped, with the vertical body portion being denoted 38, and of sufficient width to cover the side edge of the bed 4, the upper bar of the Z denoted 39 being equipped with a series of keyhole shaped stud openings 40 more particularly shown in FIGURE 8, this upper bar of the Z-shaped side rail 37 including a downwardly extending portion 41 and an inwardly projecting section 42 fastened to a transverse member 43 comprising the bed structural support.

The lower bar of the Z-shaped member comprising the side rail 37, is denoted 44, and is equipped with a lip engaging recess 45, there extending outwardly therefrom the longitudinally arranged portion 46 with a down turned lip 47 integral therewith.

The main body of the Z-shaped member comprising the side rail 37 is further provided with a series of fastening parts 49 thereon which are nuts suitably welded or otherwise affixed to the surface of the portion 38 for purposes which will be apparent shortly.

At the lower end of each of the racks, and it should be noted again that these rack members or units are all identical, the same are equipped with a side rail connector denoted 50, which is essentially a mating part to the side rail 37, in this instance being for example an extrusion having the body 51 thereof which is adapted to extend vertically along the portion 38 of the rail 37, and being equipped at its lower end with a stake bottom engaging flange 52 adapted to seat on the flame 46 previously mentioned, and extending downwardly therefrom a lip 53 to be received in the lip engaging recess 45 previously mentioned likewise.

At the upper end of the connector 50, is an interlock flange 55, extending inwardly and being equipped at intervals with an interlock stud generally denoted 56 having the enlarged head 57 and the smaller neck 58.

The stud 56 is intended to be entered through the opening corresponding thereto of the keyhole shaped interlock stud opening 40 and the neck 58 finally seated in the reduced section of said opening by forward motion of the entire rack unit after initial positioning of the lip 53 in the recess 45, the stud 56 of course having been entered in the opening 40 initially.

When the rack here being described is moved forwardly so as to position the stud in proper location, whereby the head 57 thereof will be prevented from pulling out of the opening 40, a suitable bolt 59 is inserted in a corresponding opening 60 in the connector 50, this opening thereby being opposite the fastening part or nut 49 and facilitating the drawing up of the bolt 59.

It will be understood that two or more of these bolts may be provided in each rack, in the positions indicated in FIGURE 5 at "a" and "b" for example and thus the rack is positively prevented from either moving rearwardly or being removed from its position without removal of the bolts 59 previously.

It will be apparent from the foregoing that assembly of the successive racks is effected by emplacing the one nearest the forward end of the body first, and then successively emplacing the following racks in position, sliding the same forward, fastening the same by the bolts 59, at the same time this action effecting a squeezing action against the seal 22 which is provided for each rack and against each successive rack.

In order to cover the top of the van thus provided, a series of top bows indicated in FIGURE 6 at 61 may be provided having suitable end members 62 pivotally connected at 63 with said bows so that they may be easily emplaced in the suitable openings provided therefor.

Figure 2:
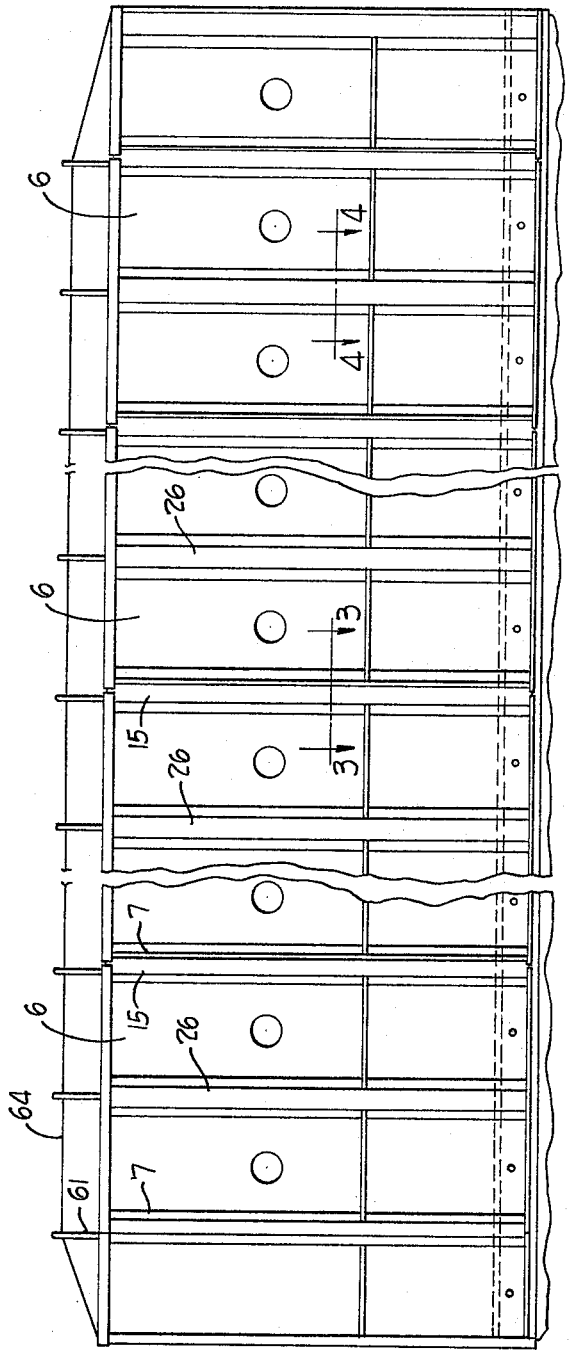
FIGURE 2 is a side view of the body portion of the van under consideration, being fragmentary in nature as will be appreciated, and illustrating the relationship of certain of the parts thereof.

As suggested in FIGURE 2, the series of bows 61 may be thereafter connected by suitable cables such as 64 and subsequently a canvas top drawn over the entire body thus provided and fastened as by tarpaulin ties such as 65 indicated in FIGURE 5.

Suitable lift pockets 66, which are arranged to be manipulated from the interior of the van, are provided for each rack to enable the handling of the same for removal and emplacement purposes.

In view of the arrangement hereinbefore described, it will be apparent that any leakage at the lower portion of the respective racks is not possible because of the arrangement of the interlocking side rail and side rail connector mounted at the bottom of each rack whereby a labyrinthine opening is obviously provided.

Similarly, leakage between the adjacent stakes 7 and 15 is not going to take place either because of the flange 23 and seal 22 provided.

We claim:

1. In body construction of the class described, in combination, a bed, means to support the bed for transport movement, a series of removable rack units extending upwardly from the bed each said rack unit including fore and aft stakes formed to mate with adjacent stakes, said units being substantially identical and having means to engage and individually interlock with the bed along the edges of the latter, and means to sealingly engage said stakes with each other.

2. The combination as claimed in claim 1, wherein the edges of the bed are provided with side rails, said rails having interlock openings therein and a lip engaging recess extending therealong, and the rack units each include a lip to engage said recess and interlock means to interlock with said openings, whereby to position said rack units and maintain the same in such position.

3. The combination as claimed in claim 2, wherein the lips extend below the rack units, the interlock means are offstanding from the units and spaced from the lips, and means are provided to fasten the rack units to the rails.

4. In body construction of the class described, in combination a bed, means to support the bed for transport movement, a series of removable rack units extending upwardly from the bed, said units being substantially identical and having means to engage and interlock with the bed along the edges of the latter, means to sealingly engage and interlock with each other, each rack unit including a forward stake extending along one edge of the unit, an aft stake along the opposite edge thereof, resilient sealing means carried by said aft stake for engagement with the forward stake of an adjacent rack unit, said aft stake likewise having a flange coextensive with the sealing means and extending along a face of said stake of said adjacent unit.

5. In body construction of the class described, in combination, a bed, means to support the bed for transport movement, a series of removable rack units extending upwardly from bed, said units being substantially identical and having means to engage and interlock with the bed along the edges of the latter, and means to sealingly engage and interlock with each other, each rack unit comprising a vertical forward stake, an aft stake parallel thereto, a side rail connector member extending along the lower edge of the unit, an interlock and bow rail along the upper edge of the unit, sheet covering means fastened to said stakes, member, and upper edge rail.

6. The combination as claimed in claim 5, wherein a side rail extends along the edge of the bed, the aft stake includes a rearwardly extending flange formed to extend over and along a forward stake of an adjacent rack, and a resilient seal is fixed to the aft stake and extends along a face thereof to engage a parallel face of such adjacent stake, the side rail connector member includes a lip along the lower portion of the unit slidable in a mating portion of the side rail, said connector member further having an interlock stud to interengage said side rail, said interengagement being effected by sliding the unit along the side rail, said movement likewise bringing said seal into sealing engagement.

7. The combination as claimed in claim 6, wherein the side rail is generally Z-shaped, the upper bar including an interlocking opening, the lower bar having a recess to engage the lip, the side rail connector is likewise generally Z-shaped, the upper bar thereof having a downwardly extending stud to interengage with the opening, and the lower bar having the lip to engage the recess.

8. The combination as claimed in claim 6, wherein the side rail is generally Z-shaped, the upper bar including an interlocking opening, the lower bar having a recess to engage the lip, the side rail connector is likewise generally Z-shaped, the upper bar thereof having a downwardly extending stud to interengage with the opening, the lower bar having the lip to engage the recess, and removable means are provided to fasten the side rail connector in position on the side rail.

References Cited by the Examiner
UNITED STATES PATENTS

| | | | |
|---|---|---|---|
| 3,010,755 | 11/1961 | Black | 296—28 |
| 3,126,224 | 3/1964 | Carter et al. | 296—28 |
| 3,141,698 | 7/1964 | Kandle | 296—36 |

BENJAMIN HERSH, *Primary Examiner.*

E. E. PORTER, J. A. PEKAR, *Assistant Examiners.*